United States Patent [19]

Kato et al.

[11] Patent Number: 5,316,597
[45] Date of Patent: May 31, 1994

[54] A NUCLEAR REACTOR COMPRISING A REACTOR VESSEL AND STRUCTURAL MEMBERS MADE OF AN AUSTENITIC STAINLESS STEEL HAVING SUPERIOR RESISTANCE TO IRRADIATION-INDUCED SEGREGATION

[75] Inventors: Takahiko Kato, Katsuta; Shinzo Ikeda, Ibaraki; Yasuhisa Aono, Hitachi; Masakiyo Izumiya, Mito; Kiyotomo Nakata, Katsuta; Isao Masaoka, Hitachi; Heishichiro Takahashi, Sapporo, all of Japan

[73] Assignee: Hitachi, Ltd., Tokyo, Japan

[21] Appl. No.: 936,647

[22] Filed: Aug. 28, 1992

[30] Foreign Application Priority Data

Sep. 3, 1991 [JP] Japan ................... 3-222992

[51] Int. Cl.$^5$ ............................................. C22C 38/48
[52] U.S. Cl. ................... 148/327; 376/339; 376/900
[58] Field of Search ............... 420/54; 148/327; 376/339, 900

[56] References Cited

U.S. PATENT DOCUMENTS 5,116,569  5/1993  Kasahara et al. ............... 148/327

FOREIGN PATENT DOCUMENTS 0067501 12/1982 European Pat. Off. .
0121630 10/1984 European Pat. Off. .
0288245 10/1988 European Pat. Off. .
0332460  9/1989 European Pat. Off. .
0447109  9/1991 European Pat. Off. .
2318237  2/1977 France .
55-110761 8/1980 Japan ........................ 420/54

Primary Examiner—Deborah Yee
Attorney, Agent, or Firm—Antonelli, Terry, Stout & Kraus

[57] ABSTRACT

A nuclear reactor having structural members made of austenitic stainless steel which is corrosion-resistant in an environment of neutron irradiation, and can suppress stress corrosion cracking and embrittlement. At least one additive selected from the group consisting of Ti more than 0.2% by weight but not more than 0.6%, Zr more than 0.2% but not more than 1.14%, Hf more than 0.2% but not more than 2.24%, V more than 0.2% but not more than 0.64%, Nb more than 0.5% but not more than 1.17% and Ta more than 0.5% but not more than 2.27% is added to austenitic stainless steel containing Cr, Ni and so on, and said at least one exists in a solid-solution state. In addition, the steel has a wholly austenitic structure substantially free of carbide. In order to maintain the irradiation-induced segregation prevention effected by the addition element, the C content is limited to 0.01 to 0.008%, and the N content is limited to 0.001 to 0.0%. The irradiation-induced segregation, of the constituent elements, such as Cr and Ni, occurring in a grain boundary under irradiation, can be prevented, and the deterioration of the corrosion resistance of the material, as well as the embrittlement, can be prevented.

17 Claims, 11 Drawing Sheets

WATER COOLING

FIG. 12
FIG. 13
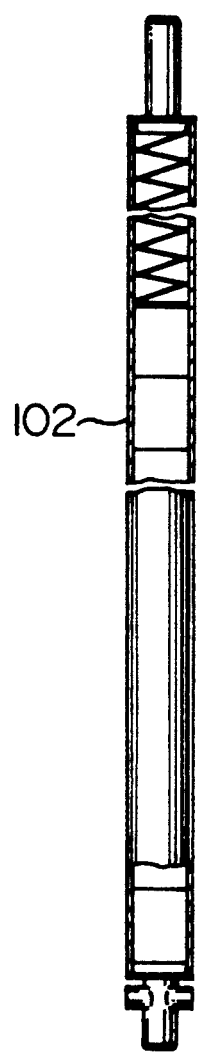
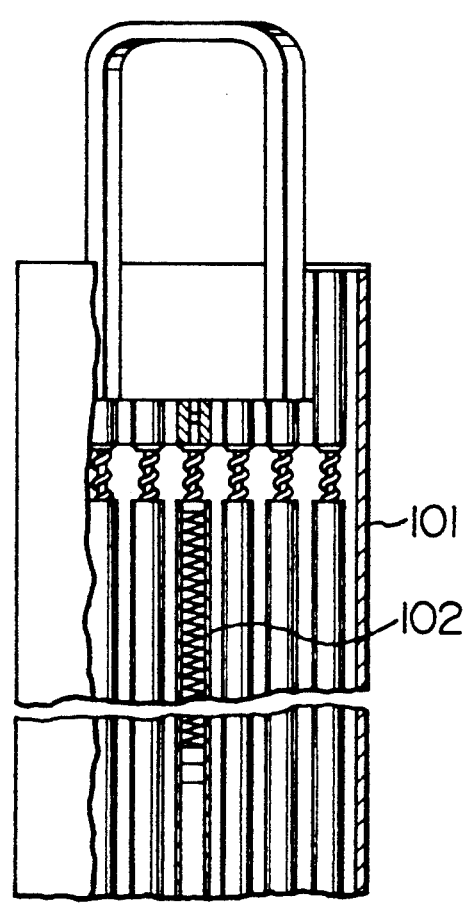

A NUCLEAR REACTOR COMPRISING A REACTOR VESSEL AND STRUCTURAL MEMBERS MADE OF AN AUSTENITIC STAINLESS STEEL HAVING SUPERIOR RESISTANCE TO IRRADIATION-INDUCED SEGREGATION

BACKGROUND OF THE INVENTION

This invention relates to austenitic stainless steel for use as a material for constituting a reactor such as a light water reactor, a fast breeder reactor and a nuclear fusion reactor, and more particularly to austenitic stainless steel having a superior irradiation-induced segregation resistance best suited for preventing the concentration change of the constituents in the crystal grain boundary (that is, for preventing irradiation-induced segregation) when the steel is exposed to a neutron-irradiating environment.

Conventionally, austenitic stainless steel SUS304 or SUS316 has been used as equipment parts of a reactor core of a light water reactor. During the operation of the nuclear reactor, the equipment parts of the reactor core is subjected to neutron irradiation, and therefore it is desired to use a material of a superior irradiation resistance for the equipment parts. Particularly, the most important properties with respect to the irradiation resistance of the material are irradiation embrittlement and stress corrosion cracking. It has been pointed out, for example, in Japanese Patent Unexamined Publication No. 57-155352 that the irradiation embrittlement can be improved by adding a trace amount of an additional element to the material. It is described in Japanese Patent Unexamined Publication No. 62-93075 that the stress corrosion cracking under irradiation can also be improved by adding a trace amount of an element.

In the above prior art for the present invention, however, the resistance to the irradiation embrittlement of the austenitic stainless steel due to the concentration change of the constituents in the crystal grain boundary which is induced upon receipt of high dose of neutron irradiation in the nuclear reactor, as well as the deterioration of the stress corrosion cracking resistance under irradiation, has not been recognized. Therefore, proper amount of the additive elements have been not studied.

SUMMARY OF THE INVENTION

It is an object of this invention to provide austenitic stainless steel having a superior irradiation-induced segregation resistance best suited for preventing a concentration change, of constituents in a crystal grain boundary under irradiation.

To achieve the above object, first austenitic stainless steel of the present invention having a superior resistance to irradiation-induced segregation consists, by weight, of: 0.001 to 0.008% C, not more than 1% Si; not more than 2% Mn; 15 to 22% Cr; 8 to 15% Ni; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, the steel having a wholly austenitic structure substantially free of carbide.

Second austenitic stainless steel of the present invention having a superior resistance to irradiation-induced segregation contains N limited to 0.001 to 0.1 wt. %, in addition to the elements constituting the first austenitic stainless steel of the present invention having a superior irradiation-induced segregation resistance, so that the effect of preventing the irradiation-induced segregation by Ti, Zr, Hf, V, Nb and Ta may not be affected.

Further, in order to achieve the above object, third austenitic stainless steel of the present invention having a superior resistance to irradiation-induced segregation consists, by weight, of: 0.001 to 0.008% C, not more than 1% Si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, the steel having a wholly austenitic structure substantially free of carbide.

Fourth austenitic stainless steel of the present invention having a superior resistance to irradiation-induced segregation contains N limited to 0.001 to 0.1 wt. %, in addition to the elements constituting the third austenitic stainless steel of the present invention having a superior irradiation-induced segregation resistance, so that the effect of preventing the irradiation-induced precipitation by Ti, Zr, Hf, V, Nb and Ta may not be affected.

The concentration change of the constituents of the austenitic stainless steel in the crystal grain boundary, which is induced under irradiation, is attributable to the movement of irradiation point defects (that is, vacancies) introduced into the material by the irradiation, and also to the movement of interstitial atoms to the grain boundary. Namely, the constituent element Cr is moved away from the grain boundary by an exchange mechanism which effects a mutual action with the vacancies to move in a direction opposite to the direction of flow of the vacancies. The constituent element Ni is moved to the grain boundary by a mechanism which effects a mutual action with the interstitial atoms to be dragged by the atoms between the lattices, so that the concentration is increased in the grain boundary. Si, as well as P and S which are among the incidental impurity elements, is moved by the latter mechanism to be dragged, so that the concentrations thereof are increased in the grain boundary.

In the present invention, the decreasing of the amount of the point defects which serve as the drive force for the constituent elements Cr, Ni, Si, P and S has been found as a method of preventing the concentration change of the constituent elements in the grain boundary. Further, as a method of decreasing the amount of the point defects occurring by the irradiation, there has been invented a method of adding the element which effects a strong mutual action with the vacancies to trap the vacancies in this element, thereby promoting a mutual extinction of the vacancies and the interstitial atoms, and the additions of various kinds of elements as well as the effective addition amounts have been studied.

As a result, it has been found from electron irradiation tests (simulation tests of neutron irradiation) using an ultra high voltage electronic microscope that by adding at least one kind selected from the group consisting, by weight, of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17% and Ta more than 0.5% but not more than 2.27% to Cr-Ni or Cr-Ni-Mo austenitic stainless steel in a solid-solutioned state, the concentration decrease or increase of the constituent elements in the grain boundary due to the irradiation can be prevented. As a result, the present invention has been made.

It is thought that these addition elements serve to strongly trap the point defects, produced by the irradiation, to promote the mutual extinction with the interstitial atoms, to extremely decrease the amount of the vacancies and the amount of the interstitial atoms, so that the movement of Cr from the grain boundary as well as the movement of Ni and etc., to the grain boundary is restrained. As a result, it is thought that the concentration change of the constituent elements in the grain boundary, which is induced under irradiation, can be prevented.

With respect to the effects of the above addition elements, if C or N is present in a large amount, C or N produces a compound of Cr in the grain boundary during the irradiation, so that the decrease of the Cr concentration in the grain boundary is induced. Therefore, unless the C content and the N content are not more than 0.008 wt. % and 0.1 wt. %, respectively, the addition elements do not perform an effective action. Further, from the viewpoints of the manufacture and cost of the steel, the lower limit of the C or N content is more than 0.001 wt. %. Further, it is remarkable that, by limiting the amount of carbon to the range more than 0.01% but not more than 0.008%, it becomes possible to make the additive(s) of Ti, Zr, Hf, V, Nb and Ta be in a solid-solution state in the austenitic stainless steel and to make the austenitic stainless steel have a wholly austenitic structure substantially free of carbide. If the mount of addition of the above-mentioned Ti, Zr, Hf, V, Nb and Ta are less than their lower limit values mentioned above, respectively, the above-mentioned effect can not be achieved. If the addition amount exceeds the upper limit value, the weldability and the workability are adversely affected, and besides the austenitic structure becomes unstable to produce a ferrite phase or a martensitic phase in the grain boundary and etc., which may induce cracking in the nuclear reactor. Therefore, these elements in the above addition range are solid-solutioned in the austenitic stainless steel. Preferably, Ti is 0.45 to 0.6%, Zr is 0.3 to 1.0%, Hf is 0.7 to 1.9%, V is 0.3 to 0.55%, Nb is 0.5 to 0.9%, and Ta is 1 to 2.

In view of the irradiation resistance, the strength and the corrosion resistance, the other constituent elements are in the following weight range.

Si: not more than 1%

Si makes the deoxidation perfect when melting the steel, and therefore Si can be added in the range of not more than 1%. This element is also effective in enhancing the resistance to the irradiation embrittlement; however, if this content exceeds 1%, the stress corrosion cracking property in high temperature water is adversely affected, and therefore its content is not more than 1%. Preferable range thereof is not more than 0.5%.

Mn: not more than 2%

Even if this element is not added, the steel can be used as a material for part of the above equipment. However, in order to further increase the strength and the workability, it is preferred to add this element. However, if this content exceeds 2%, this invites embrittlement, and preferably its content is 1.0 to 1.8 in order to achieve a good workability.

Cr: 15 to 22%

If the Cr content is less than 15%, the corrosion resistance and the strength are lowered, and if this content exceeds 22%, the irradiation resistance is lowered. Further, during the irradiation, this element produces the o phase which is harmful to mechanical properties, and therefore preferably its content is 15 to 18%. In order to suppress the occurrence of the o phase due to a fluctuation of the composition of the material as much as possible,, 17 to 20% is preferred.

Ni: 8 to 15%

From the viewpoints of the corrosion resistance, the stabilization of the austenitic phase under irradiation, and the irradiation resistance, the N content is preferably 8 to 15%. Particularly, since the amount of C which is the austenitic phase-stabilizing element must be limited to a low value for the above-mentioned reason, 10 to 14% is preferred for the stabilization of the austenitic phase.

Mo: 0 to 3%

Even if this element is not added, the steel can be used as a material for part of the above equipment. However, if it is desired to further improve the corrosion resistance and the strength, this is an effective addition element. However, if the amount of addition exceeds 3%, it promotes the precipitation of the phase, which invites the embrittlement of the material, and therefore this is not desirable. In order to suppress the precipitation of the 6 phase and also to achieve the better corrosion resistance and higher strength, it is more preferred to add 2 to 3% of this element.

BRIEF DESCRIPTION OF THE DRAWINGS

FIG. 12 is a partial cross section of a fuel rod; and

FIG. 13 is a partially broken perspective view of channel box and fuel cradding tube.

PREFERRED EMBODIMENTS OF THE INVENTION

Example 1

Figure 1:
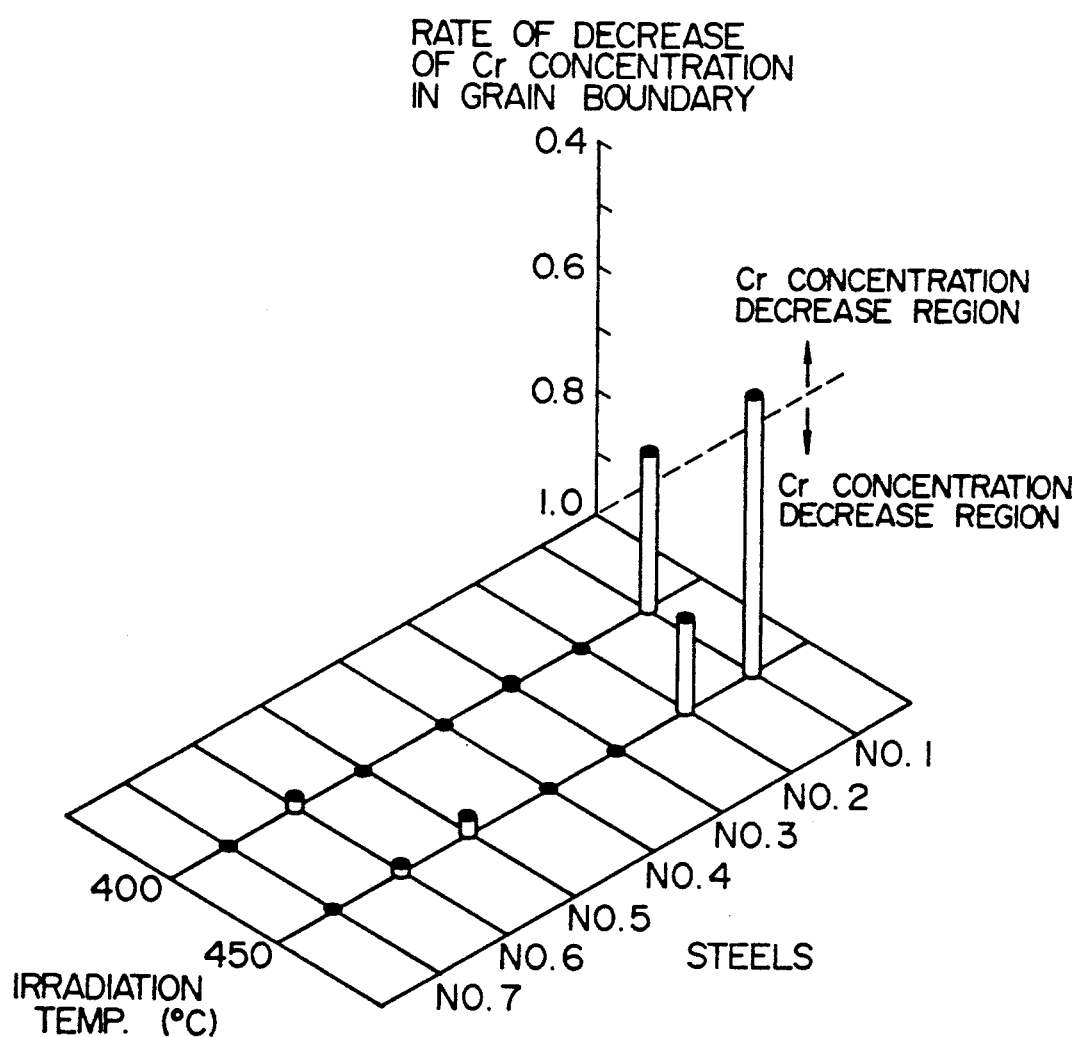
FIG. 1 is a diagram showing the rate of change of the Cr concentration in a grain boundary under irradiation.

Table 1 shows chemical compositions (wt. %) (except for a main component, Fe) of steel kind Nos. 2, 3, 4, 5, 6 and 7 of austenitic stainless steel of the present invention having a superior resistance to irradiation-induced segregation, as well as a chemical composition of steel kind No. 1 of comparative steel, in which steels of the Example 1 of the present invention both carbon and silicon were contained as impurities, and several % ferrite occurred at the stage of an ingot, however, wholly austenitic uniform structure was able to be produced by effecting solution heat treatment after hot rolling.

rates of change of the Cr and Ni concentrations in the grain boundary are values allocated by the concentrations in the grain boundary after the irradiation.

Example 2

Table 2 shows chemical compositions (except for a main component, Fe) of austenitic stainless steel Nos. 8, 9 and 10 of the present invention, as well as chemical compositions of comparative steel Nos. 11 and 12, in which steels both carbon and silicon were contained as incidental impurities, and wholly austenitic uniform structure was able to be obtained by effecting a solution heat treatment after hot rolling.

TABLE 2

| Steel kind No. | Chemical composition of Test Materials (wt. %) | | | | | | | | | | | |
|---|---|---|---|---|---|---|---|---|---|---|---|---|
| | C | Si | Mn | P | S | Ni | Cr | Mo | Al | N | O | Addition element |
| 8 | 0.003 | <0.01 | 1.64 | 0.002 | 0.003 | 13.9 | 16.7 | 2.3 | 0.027 | 0.0079 | 0.0067 | 0.78 Zr |
| 9 | 0.005 | <0.01 | 1.62 | 0.002 | 0.002 | 13.8 | 16.6 | 2.2 | 0.023 | 0.0034 | 0.0033 | 0.90 Hf |
| 10 | 0.004 | <0.01 | 1.66 | 0.003 | 0.003 | 13.9 | 16.9 | 2.2 | — | 0.0018 | 0.0187 | 0.28 V |
| 11 | 0.010 | <0.01 | 1.65 | 0.003 | 0.003 | 13.8 | 17.3 | 2.2 | — | 0.0025 | 0.0094 | 0.49 Nb |
| 12 | 0.009 | 0.01 | 1.61 | 0.002 | 0.003 | 13.8 | 16.9 | 2.2 | — | 0.0028 | 0.0132 | 0.74 Ta |
| 13 | 0.003 | <0.01 | 1.60 | 0.002 | 0.002 | 13.9 | 16.7 | 2.3 | 0.026 | 0.0030 | 0.0050 | 0.48 Zr + 0.06 Ti |

These steels were prepared according to the same process as in Example 1. An electron irradiation was applied at 500° C. in the same manner as in Example 1,

TABLE 1

| Steel kind No. | Chemical composition of Test Materials (wt. %) | | | | | | | | | | | |
|---|---|---|---|---|---|---|---|---|---|---|---|---|
| | C | Si | Mn | P | S | Ni | Cr | Mo | Al | N | O | Addition element |
| 1 | 0.003 | 0.01 | 1.65 | 0.002 | 0.003 | 13.9 | 17.7 | 2.2 | 0.017 | 0.0020 | 0.0131 | None |
| 2 | 0.003 | 0.01 | 1.66 | 0.003 | 0.003 | 13.7 | 17.0 | 2.2 | 0.024 | 0.0019 | 0.0082 | 0.41 Ti |
| 3 | 0.003 | <0.01 | 1.64 | 0.002 | 0.003 | 13.9 | 16.7 | 2.3 | 0.027 | 0.0079 | 0.0054 | 0.30 Zr |
| 4 | 0.004 | 0.01 | 1.63 | 0.003 | 0.003 | 13.8 | 16.7 | 2.2 | 0.023 | 0.0034 | 0.0041 | 0.24 Hf |
| 5 | 0.004 | 0.01 | 1.65 | 0.003 | 0.003 | 13.8 | 16.8 | 2.2 | 0.025 | 0.0018 | 0.0053 | 0.20 V |
| 6 | 0.003 | 0.01 | 1.64 | 0.002 | 0.003 | 13.8 | 17.0 | 2.2 | 0.030 | 0.0025 | 0.0076 | 1.01 Nb |
| 7 | 0.004 | 0.01 | 1.63 | 0.003 | 0.003 | 13.8 | 16.8 | 2.2 | 0.029 | 0.0028 | 0.0062 | 1.02 Ta |

No. 1 corresponds to SUS316L steel. The steels of Nos. 2, 3, 4, 5, 6 and 7 contained Ti, Zr, Hf, V, Nb and Ta, respectively, in the addition range of the present invention. The Si content of each steel is as small as 0.01%, and this element is incidentally contained. Each of these steels was prepared by melting under vacuum, and casting the molten metals into an ingot of 10 kg, and hot rolling the ingot at 1050° C., and then cold rolling it, and finally subjecting it to a solution treatment for 15 to 30 minutes. Samples cut from these steels by electropolishing were subjected to an irradiation test in which an electron irradiation simulating a neutron irradiation was applied to the samples in a ultra-high voltage electronic microscope. With respect to the irradiation conditions, the electron acceleration voltage was 1 MV, and the irradiation amount was 10 dpa (1 dpa is equivalent to about $1 \times 10^{21}$ n/cm² of a neutron irradiation amount.

Figure 2:
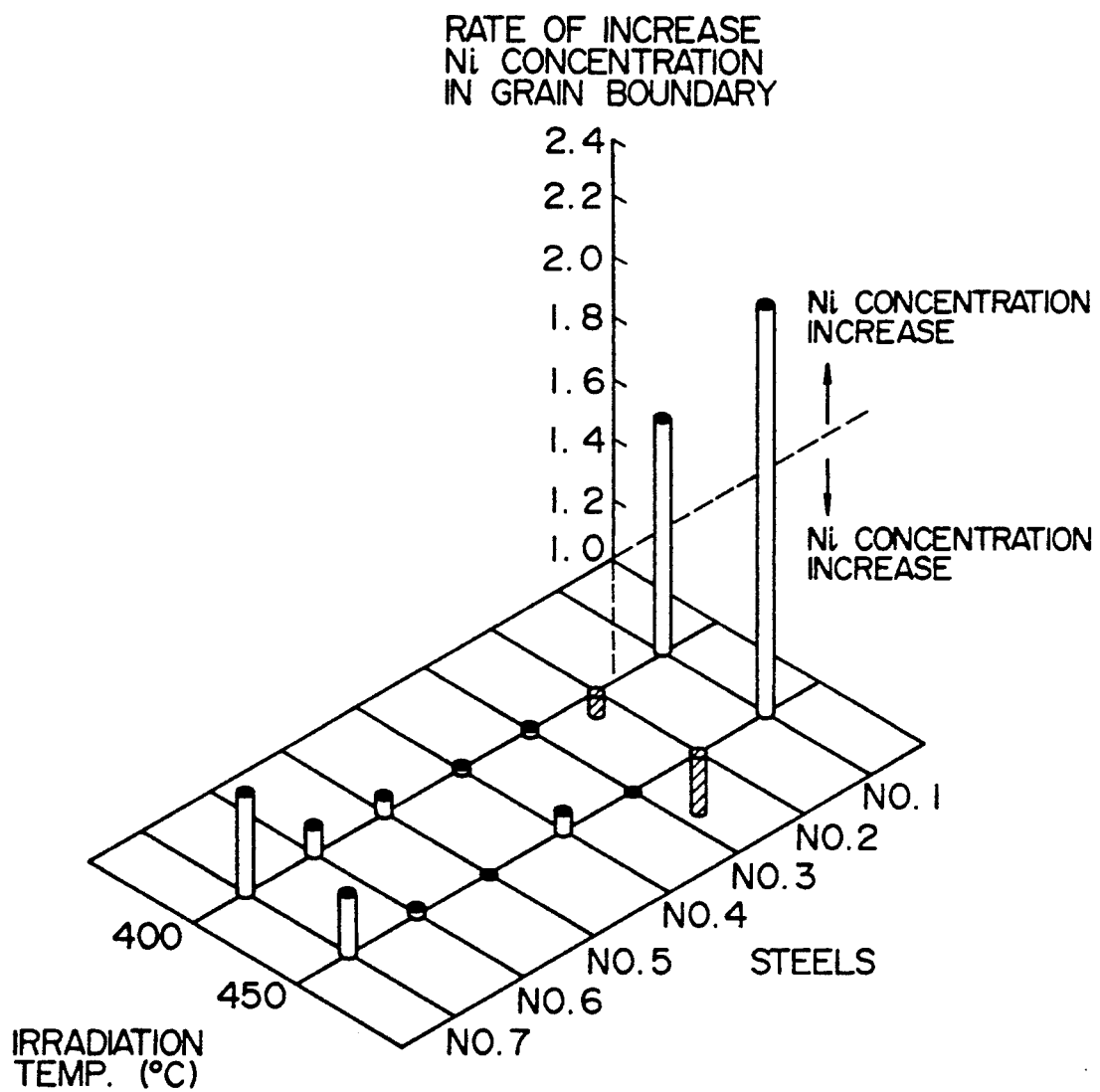
FIG. 2 is a diagram showing the rate of change of the Ni concentration in a grain boundary under irradiation.
Figure 3:
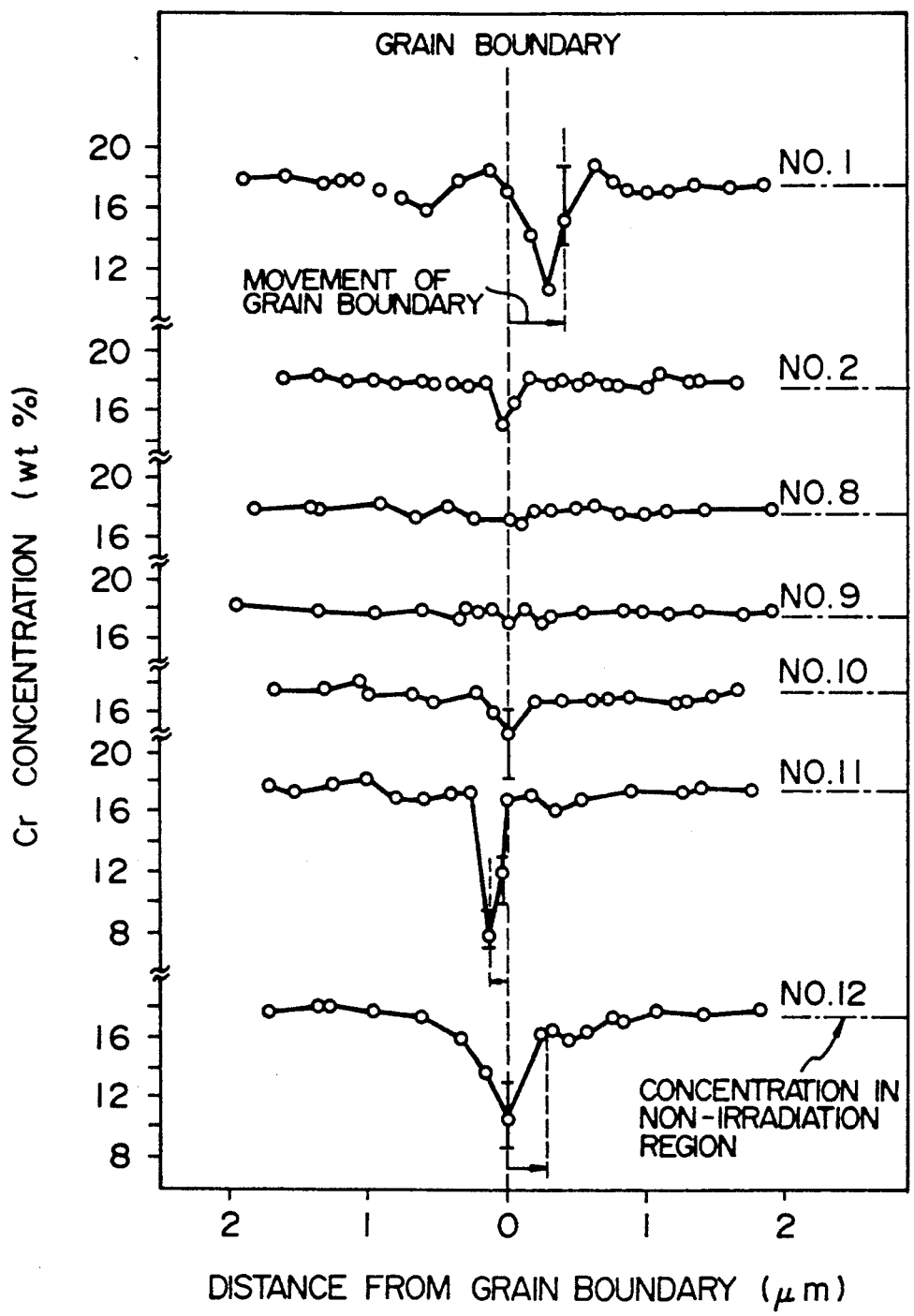
FIG. 3 is a diagram showing the rate of change of the Cr concentration in the vicinity of the grain boundary under irradiation.
Figure 4:
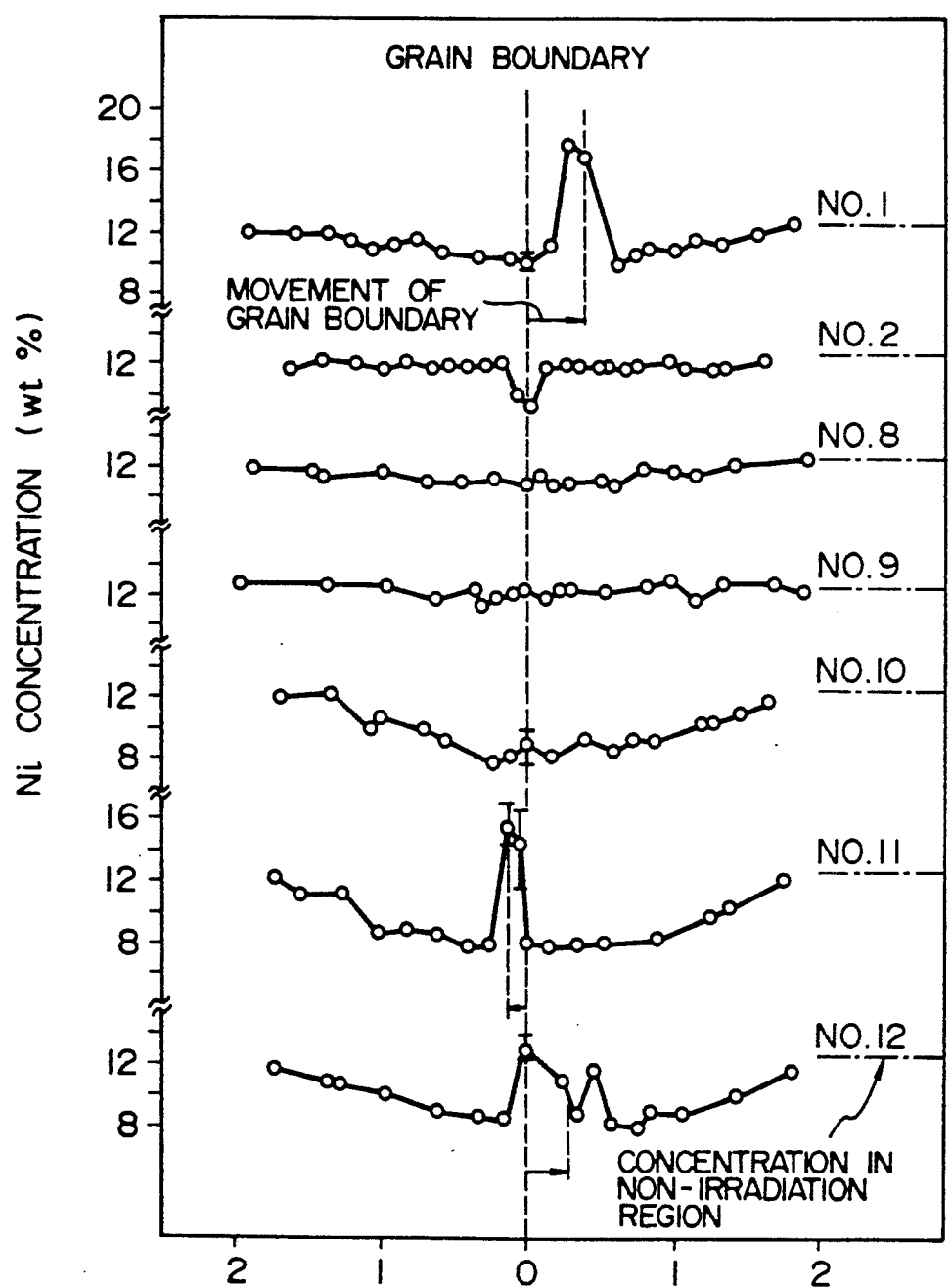
FIG. 4 is a diagram showing the rate of change of the Ni concentration in the vicinity of the grain boundary under irradiation.

FIGS. 1 and 2 respectively show the rate of decrease of the Cr concentration and the rate of increase of the Ni concentration for each steel at irradiation temperatures of 400° C. and 450° C., these concentration decrease and increase being induced in the grain boundary by the irradiation. The concentration analysis was effected by an EDX analysis. The irradiation-induced segregation at either temperature was extremely suppressed in any of the steels of the present invention, as compared with the comparative steel No. 1. Here, the and the concentration change in the vicinity of the grain boundary was examined by an EDX analysis. FIGS. 3 and 4 show the changes of the Cr concentration and the Ni concentration, respectively. Here, the results of the 500° C. irradiation applied to the comparative steel No. 1 (SUS316L) and the steel No. 2 of the present invention (containing Ti) used in Example 1 are also shown. The comparative steel Nos. 11 and 12 respectively contain Nb and Ta in a small amount, and are subjected to the irradiation-induced segregation (the decrease of the Cr concentration and the increase of the Ni concentration in the grain boundary) of a level more than that of the comparative steel No. 1 (SUS316L) with no addition element. It will be appreciated that the irradiation-induced segregation of either of Cr and Ni is extremely suppressed in the steel Nos. 2, 8, 9, 10 and 13 of the present invention.

In the comparative steel Nos. 1, 11 and 12, the movement to the grain boundary is caused by the irradiation, and it is thought that this occurs because the movement of the point defects (that is, the vacancies) introduced into the material by the irradiation, as well as the movement of the interstitial atoms to the grain boundary, is vigorous. On the other hand, the fact that the movement to the grain boundary does not occur in the steel Nos. 2, 8, 9, 10 and 13 of the present invention indicates the mutual extinction between the vacancies and the interstitial atoms is promoted by the addition element to suppress the moving of these point defects to the grain boundary. This is one phenomenon which clearly shows the effect of the present invention.

Example 3

Figure 5:
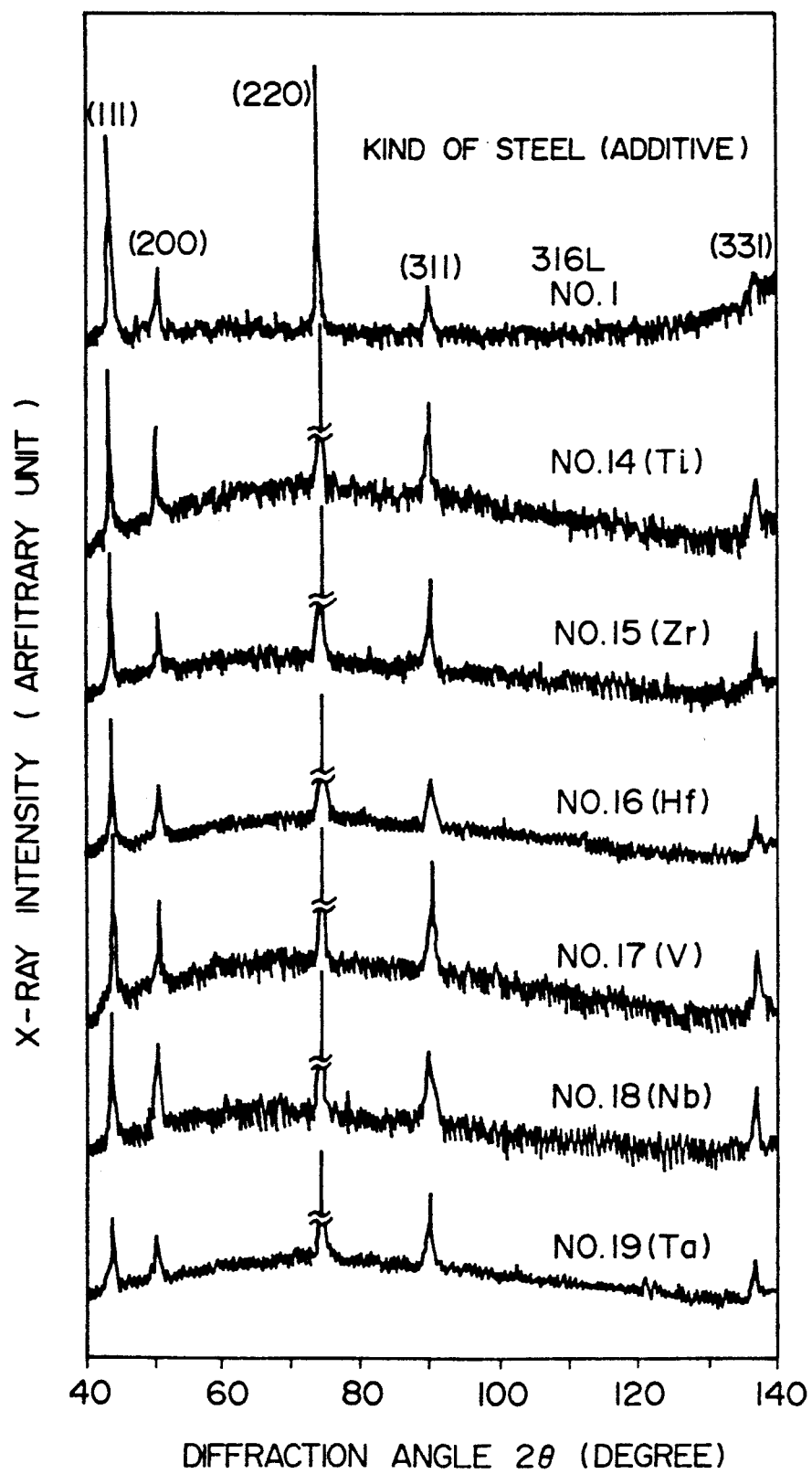
FIG. 5 is a diagram showing an X-ray diffraction pattern of steels of the invention and comparative steel.

FIG. 5 shows the results of X-ray diffraction of steels, prepared by adding Ti, Zr, Hf, V, Nb and Ta according to the same process as in Example 1, using the comparative steel No. 1 (SUS316L) of Example 1 as a base alloy, the X-ray diffraction being carried out to determine how much the extent of each of these elements was able to be solid-solutioned. Each of steel Nos. 14 to 19 contains a respective one of the above elements, and the amount of each additive added to the steel No. 1 was, by weight, 0.45% Ti, 0.86% Zr, 1.7% Hf, 0.48% V, 0.87% Nb, and 1.71% Ta. In each of the steels respectively having these elements added thereto, only the peak of the austenitic structure was able to be observed as in the comparative steel No. 1 (SUS316L), and it can be appreciated that all of the elements can be solid-solutioned in this range and that each of the steels has a wholly austenitic structure substantially free of carbide. These steels having the addition elements are steels of the present invention. However, if the amount of addition of each element exceeds the above value, a peak of the ferrite phase appears in each steel. Therefore, in view of the embrittlement and etc., preferably, the maximum addition amounts should be as in the steels shown in FIG. 5.

Example 4

Figure 6:
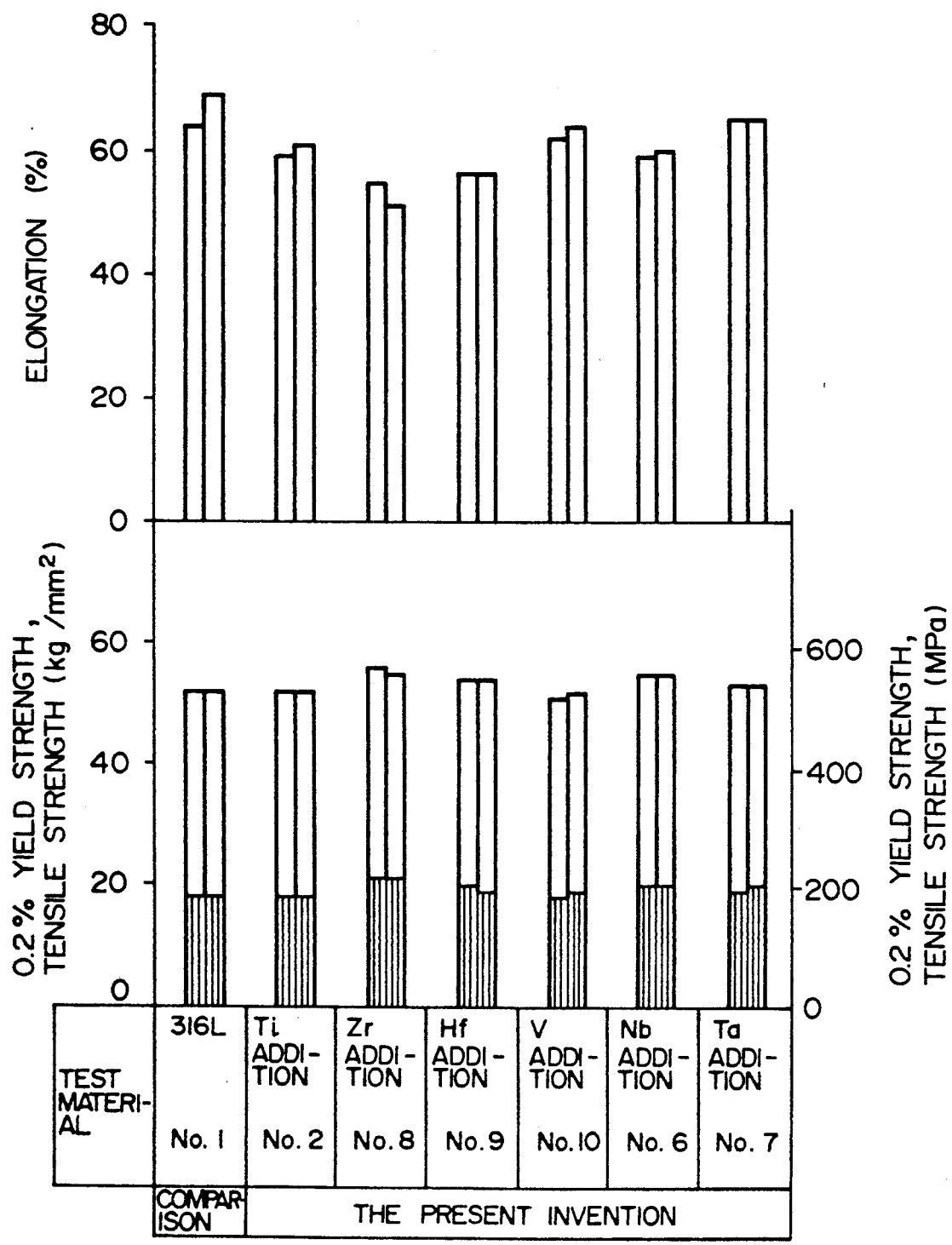
FIG. 6 is a diagram showing results of a tensile test of the steels of the invention and the comparative steel.

In order to compare the mechanical properties of the steel Nos. 2, 8, 9, 10, 5 and 6 of the present invention, prepared in Examples 1 and 2, with those of the comparative steel No. 1, a tensile test was carried out. With respect to the size of tensile test piece, the overall length was 50 mm, the length of a parallel portion was 20 mm, the cross-sectional shape of the parallel portion was 2×2 (cm), and the radius of the ends of the parallel portion wa R4. FIG. 6 shows the results of the tensile strength and the yield strength of 0.2% obtained by the tensile test in which two test pieces for each steel were subjected to the tensile test at room temperature. The 0.2% yield strength is represented by the height of a hatched bar, and the tensile strength is represented by the height of the hatched portion plus the height of a void portion just above the hatched portion. The values of the 0.2% yield strength and tensile strength which are not less than those obtained with the comparative steel No. 1 can be obtained with the steels of the present invention. With respect to the elongation, although the Zr-added steel No. 2 is about 20% smaller, good results sufficiently exceeding the standards of the design of the equipment within the nuclear reactor and etc., were obtained when any of the elements was added, and it will be appreciated that the mechanical properties of the steels of the present invention are suited as the structural material.

Example 5

Each of the steel Nos. 2, 8, 9, 10, 5 and 6 of the present invention as described in Example 4 was cut into a piece of a rectangular shape (20×1×1 mm), and nitrogen was added to these pieces at 1050° in an atmosphere of a methane-hydrogen mixture gas in an induction furnace to prepare steels having the nitrogen content of about 0.01 wt. %, about 0.10 wt. % and about 0.21 wt. %. These steels were subjected to a homogeneous solid-solutioning treatment in argon at 1150° C. for 30 minutes, and then a sample for the observation by an electronic microscope was cut from each of the steels, and was subjected to electron irradiation (500° C.) as in Example 1. As a result, during the temperature rise period before the irradiation and during the electron irradiation, a large amount of nitride was formed in the grains and the grain boundary of the 0.21 wt. % nitrogen-added material, and the concentration change of the constituent element in the grain boundary was more than that obtained with the comparative steel No. 1. From this result, it is preferred that the N content should not exceed 0.1%. Also, if the amount of the irradiation exceeds 3 dpa with respect to the 0.10% N-added material, similar results are obtained, and therefore it is not preferred to use such a material as a member subjected to a high dose of irradiation. In this case, if the irradiation amount is not more than 3 dpa, the irradiation-induced segregation is suppressed. Even the irradiation amount of 10 dpa does not pose any problem in a case of the 0.01% N-added material, and results similar to those in Example 1 (FIGS. 1 and 2) were obtained.

Example 6

Each of the steel Nos. 2, 8, 9, 10, 5 and 6 of the present invention as described in Example 4 was cut into a piece of a rectangular shape (20×1×1 mm), and carbon (C) was added to these pieces at 1050° in an atmosphere of a ammonia-hydrogen mixture gas in an induction furnace to prepare steels having the carbon content of about 0.03 wt. % and about 0.06 wt. %. These steels were subjected to a homogeneous solid-solutioning treatment in argon at 1150° C. for 30 minutes, and then a sample for the observation by an electronic microscope was cut from each of the steels, and was subjected to electron irradiation (500° C.) as in Example 1. As a result, in the 0.06% C-contained material, carbide was formed in the vicinity of the crystal grain boundary during the irradiation, and the concentration change of Cr and Ni in the grain boundary after the irradiation of 10 dpa was not less than the comparative steel No. 1. However, in the case of the 0.03 wt. % C-contained material, the effect of preventing the irradiation-induced segregation by the addition of Ti, Zr, Hf, V, Nb and Ta was sound. Therefore, it is preferred that the C content should be not more than 0.03 wt. %.

Example 7

Figure 7:
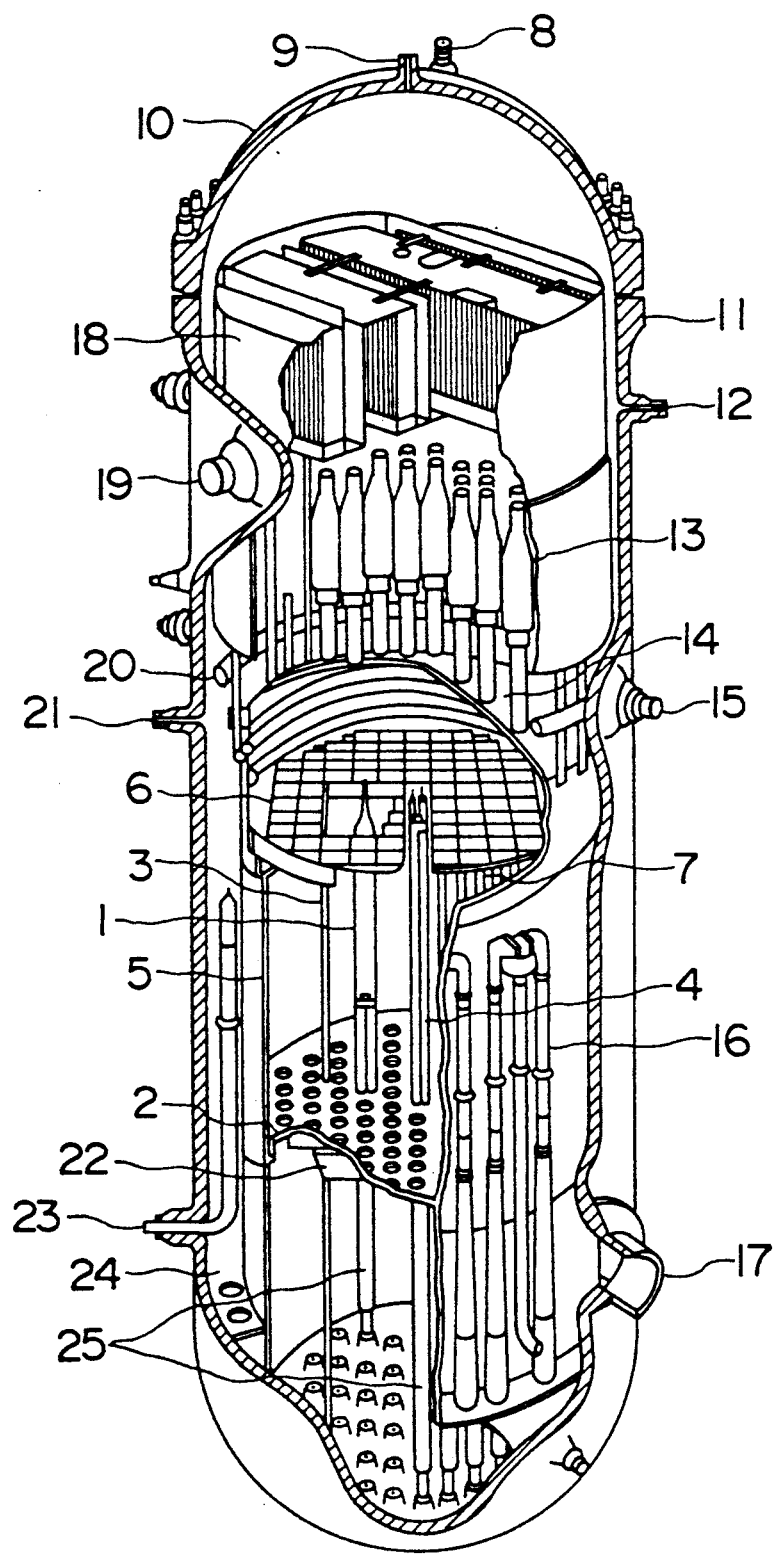
FIG. 7 is a partly-broken, perspective view of an important portion of a reactor core portion of a boiling water reactor.

Next, an example of apparatus to which the steel of the present invention is applied will now be described. FIG. 7 is a partly-broken, schematic, perspective view of an important portion of a reactor core portion of a boiling light water reactor (BWR). In this figure, reference numeral 1 denotes a neutron source pipe, reference numeral 2 a reactor core support plate, reference numeral 3 a neutron instrumentation pipe, reference numeral 4 a control rod, reference numeral 5 a shroud, and reference numeral 6 an upper lattice plate. These structural members and equipment constitute the reactor core of the light water reactor, and is used in an environment subjected to a large amount of irradiation of neutrons and in water at high temperature of 288° C. and a high pressure of 7 MPa. By forming these structural members and equipment by the steel of the present invention, the concentration change of the constituent elements in the grain boundary under the neutron irradiation can be suppressed, and the corrosion resistance under irradiation, the irradiation-induced SCC and the embrittlement in the grain boundary can be prevented. The steel of the present invention can be used for parts, provided between these structural members and equipment, Other than those shown in FIG. 7, and by doing so, similar effects can be obtained. Further, by using the steel of the present invention for structural members and equipment of a reactor core portion of other water-cooled reactor than the boiling water reactor, similar effects can be expected.

When the steels of the present invention in Examples 1 to 6 are used for the above-mentioned neutron source pipe 1, the neutron instrumentation pipe 3, a control rod insertion pipe, a casing of a crisscross shape in which this rod insertion pipe is inserted, a channel box 111 (FIG. 13) of a fuel assembly 7, and a fuel cradding pipe 102 (FIGS. 12, 13) they are superior in neutron irradiation SCC resistance. To obtain each of these members, a steel ingot is hot rolled, and a solution treatment is applied, and subsequently cold rolling and annealing are effected, these steps being repeated.

Each of the reactor core support plate 2, the shroud 5 and the upper lattice plate 6 is obtained by hot rolling an ingot of the steel of the present invention and subjecting it to a solution treatment. The reactor core is constituted by the devices shown below, and the steels of the present invention can be also used for these structural members in the reactor. The structural members in the reactor include a upper mirror spray nozzle 8, a vent nozzle 9, a pressure vessel lid 10, a pressure vessel flange 11, a measurement nozzle 12, a steam separator 13, a shroud head 14, a feed water inlet nozzle 15, a jet pump 16, a re-circulating water outlet nozzle 17, a steam dryer 18, a steam seasoning device 18, a steam outlet nozzle 19, a feed water sparer 20, a core spray nozzle 21, a lower core lattice 22, a recirculating water inlet nozzle 23, a baffle plate 24, a control rod guide pipe 25, and so on.

The steels of the present invention can also be applied to a new-type converter reactor (ABWR) having an internal pump in the reactor, and a pressurized water reactor (PWR). With respect to the structure within the ABWR, the internal pump is provided in the reactor instead of the jet pump 16 of the above-mentioned BWR, and other portions are similar to those of the BWR. Therefore, the alloys of the present invention can be applied to the equipment and structural members within the ABWR reactor, as described above for the BWR. The use of the alloys of the present invention provides a higher safety.

Figure 8:
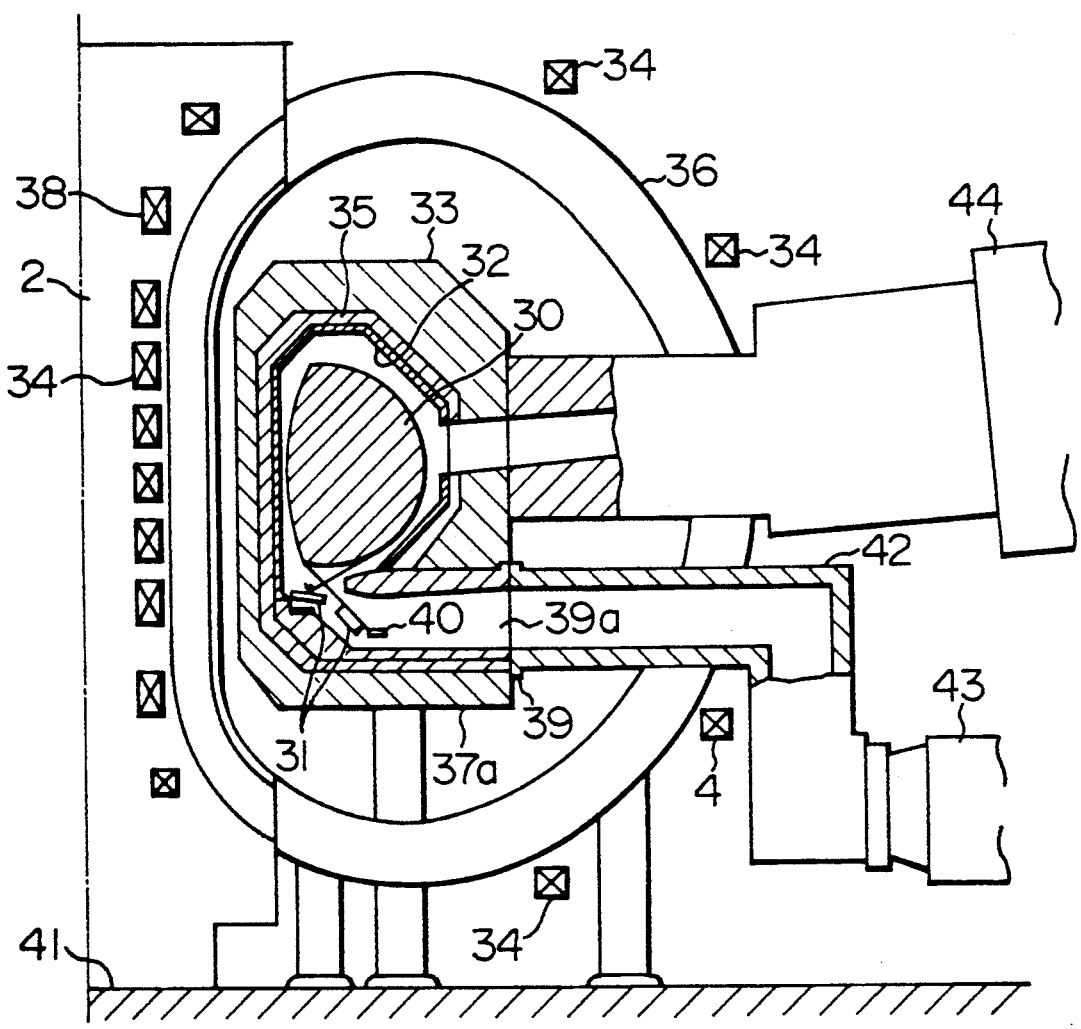
FIG. 8 is a longitudinal-sectional view of a nuclear fusion reactor.

FIG. 8 is a longitudinal cross sectional schematic view of a torus-type nuclear fusion reactor. In FIG. 8, the fusion reactor comprises poloidal magnetic coils 34 and diver coils 38 both for effecting the heating and controlling of plasma 30, toloidal coils 36 for confining the plasma 30, a hollow vacuum vessel 33 of a doughnut shape disposed within the toloidal coils 36, a blanket 35 for feeding a coolant such as helium so as to effect heat exchange which blanket is disposed within the vacuum vessel and within which blanket plasma is generated with deuterium or tritium being introduced therein, a shielding tubular body 39 provided on the inside of the vacuum vessel, diverter plates 31 disposed at the inside of the shielding tubular body so that the diverter plate is connected to the diverter coil 38 and is supported by a cooling tube header onto which diverter plates a part of plasma (impurities of He etc.) taken out from the plasma 30 is applied, an exhaust pump 43 connected to an opening 39a of the shielding tubular body 39 through an exhausting tube 42, and a neutron injecting device 44 connected to the vacuum vessel above the exhaust tube 42. These structural members and equipment are subjected to irradiation of various corpuscular rays leaking from a large amount of neutrons and plasmas, and also are designed to be in contact with water for cooling purposes, and therefore are brought into contact with hot water. By forming these structural members and equipment by the steel of the present invention, the concentration change of the constituents in the grain boundary under irradiation can be prevented, and the corrosion resistance is enhanced.

Figure 10:
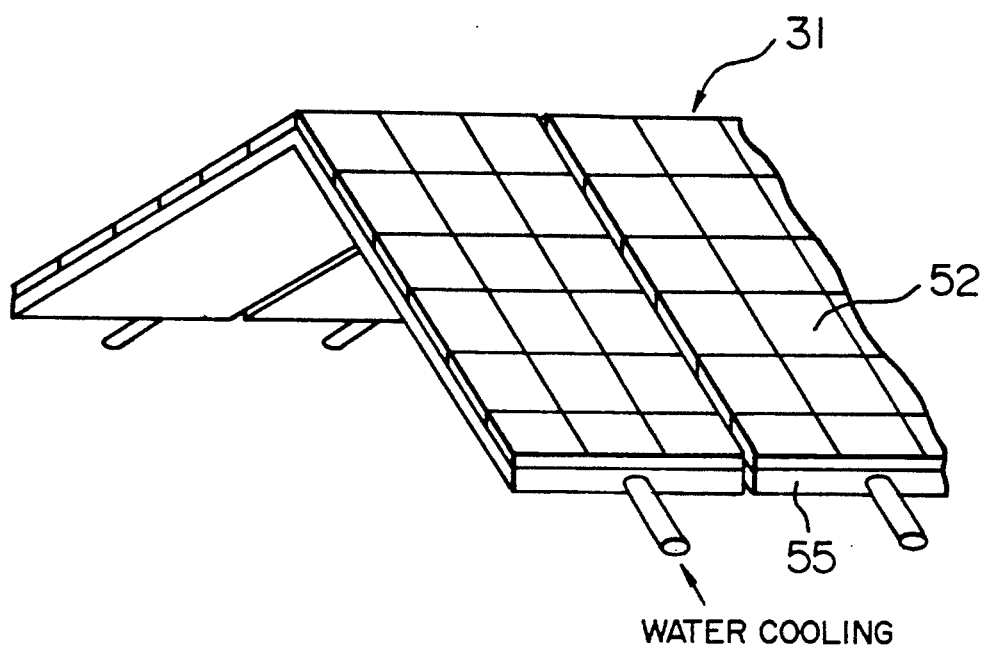
FIG. 10 is a perspective view of a diverter.
Figure 11:
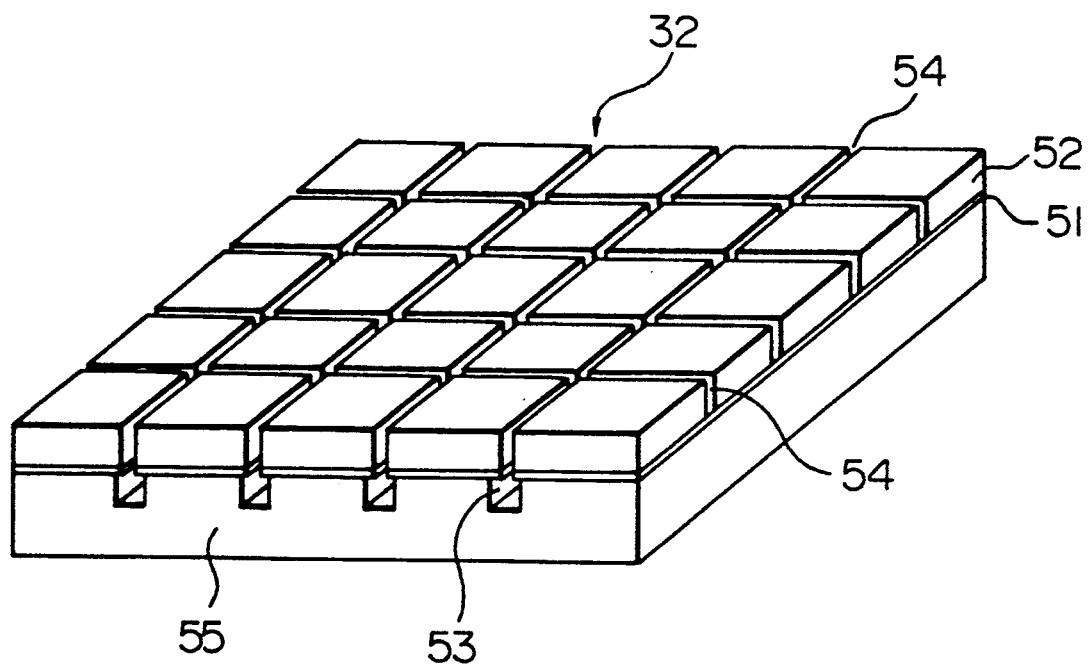
FIG. 11 is a perspective view of a first wall.

FIG. 10 is a perspective view of a diverter, in which ceramic tiles 52 are bonded to a metal member 55 by brazing, and FIG. 11 is a perspective view of the first wall, in which the reference numeral 51 shows brazing, 52 the ceramic tiles, 53 grooves for receiving a brazing plate, and 54 shows grooves.

The diverter 31, the first wall 32 and the vacuum vessel 33 are constituted by water-cooled structure made of the steel of the present invention. The diverter 31 and the first wall 32 has a construction in which a block of a low atomic number (for example, SiC, $Si_3N_4$, AlN, $Al_2O_3$, ceramic tiles 4) bonded mechanically or metallurgically to the surface of the metallic member of the cooled structure. The steels of the present invention can be used for these, and they are constituted by a plate or a pipe.

Although the nuclear fusion apparatus is not shown, it comprises a poloidal coil and an evacuator in addition to a toroidal coil 34. Other types of nuclear fusion apparatus include an open magnetic field type, and an inertia-confined laser heating type, and the steels of the present invention can be applied to these types, and a high reliability can be obtained.

Example 8

When the parts of the BWR in Example 7 were subjected to the neutron irradiation (not less than about $5 \times 10^{20}$ n/cm$^2$) in an environment of water at a high temperature of 288° C. and a high pressure of 7 MPa, a stress corrosion cracking developed in these parts. When these parts were made of austenitic stainless steels SUS304, SUS316, SUS316L and so on, the stress corrosion cracking similarly occurred. However, when the similar neutron irradiation was applied to the above parts made of the steel Nos. 2, 8, 9, 10, 5 and 6 of the present invention in Example 4, any stress corrosion cracking did not occur even under the neutron irradiation of $1 \times 10^{22}$ n/cm$^2$.

Example 9

The addition of Ti, Zr, Hf, V, Nb and Ta to the austenitic stainless steels mentioned in Examples 1 to 6 makes clear the effect of the addition of at least one of the elements. It has been found from various studies that the force of the mutual action between these elements and the vacancies depends greatly on the size of these elements in the austenitic stainless steel.

Figure 9:
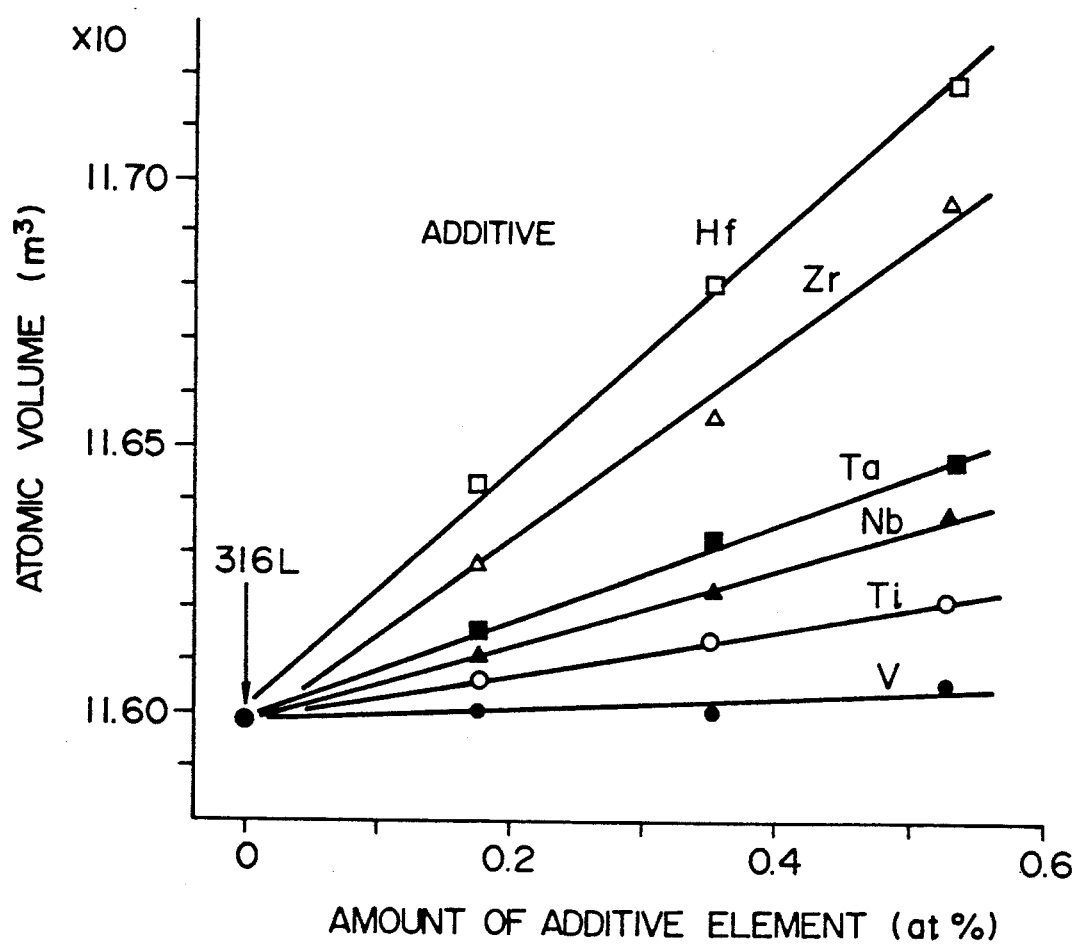
FIG. 9 is a diagram showing the dependency of an atomic volume of SUS316L steel on the amount of addition of elements.

FIG. 9 shows how the volume occupied by one atom in Steel No. 1, SUS316L steel, (that is, the atomic volume) changes with the amount of addition of the addition element, this result being found by X-ray diffraction as in FIG. 5. The atomic volume increases linearly with the increase of the addition amount, and therefore it will be appreciated that all of these elements are an oversize element greater than the average atomic size of Steel No. 1 (SUS316L steel). From this result, it has been found that the force of the mutual action between the vacancies and these elements is attributable to the elastic strain field which expands the crystal lattice produced in SUS316L steel by these elements.

The quantitative size (size factor) of each of the elements in SUS316L steel (which is found by the gradient of the straight line in FIG. 9) is shown in Table 3.

TABLE 3

Size factor of addition elements in 316L steel
Ωsf: volume size factor
lsf: linear size factor

| Addition element | Ωsf (%) | lsf (%) |
|---|---|---|
| Ti | 37.33 | 11.15 |
| Zr | 156.16 | 36.83 |
| Hf | 193.13 | 43.12 |
| V | 9.97 | 3.22 |
| Nb | 62.48 | 17.56 |
| Ta | 78.58 | 21.32 |

The order of the sizes was Hf>Zr>Nb>Ti>V->Ta. Therefore, the forces of the mutual action between these elements and the vacancies is higher in this order, and as a result the amount of the mutual extinction of the point defects is larger in this order.

On the other hand, the amount of formation of the secondary defects (the transition loop, the atom hole assembly, voids etc.) in the crystal grain decreases with the increase of the size factor of the addition element, and therefore the amount of the point defects, consumed for the formation of the secondary defects and extinguished, decreases with the increase of the size factor.

It is thought that the point defects moving into the crystal grain boundary decreases in proportion to the sum of the amount of mutual extinction of the point defects and the amount of the point defects consumed for the formation of the secondary defects, and therefore when Nb or Ta having a medium size factor is added, the movement flux of the point defects to the grain boundary is the peak. As a result, as shown in FIGS. 3 and 4, the irradiation-induced segregation in the Nb-added steel (comparative steel No. 11) and the Ta-added steel (comparative steel No. 12) is increased.

Therefore, in order to prevent the irradiation-induced segregation, when V or Ti of a small size factor, or Zr or Hf of a large size factor is to be added, a satisfactory effect is obtained even if the minimum addition amount is low. However, when Nb or T of a medium size factor is to be added, a satisfactory effect can not obtained unless the minimum addition amount is high.

In view of the foregoing, the minimum addition amount effective in preventing the irradiation-induced segregation has been studied, and the following results have been obtained. Namely, with respect to the minimum addition amount (wt. %), Ti is more than 0.2%, Zr is more than 0.2%, Hf is more than 0.2%, V is more than 0.2%, Nb is more than 0.5%, and Ta is more than 0.5%. However, preferably, their upper limit amount should not exceed the value recited in claim 1 for the reason mentioned in Example 3.

According to the present invention, the austenitic stainless steel having a superior resistance to the irradiation-induced segregation is produced by adding at least one of Ti, Zr, Hf, V, Nb and Ta and by limiting the C content and the N content respectively to 0.001 to 0.008% and 0.001 to 0.1%. Therefore, when the stainless steel is subjected to neutron irradiation, the added element can prevent the movement of the constituent elements (e.g. Cr, Ni) of the stainless steel in the grain boundary, and the concentration change of the constituent elements developing in the grain boundary under irradiation (that is, the irradiation-induced segregation) can be prevented, and the deterioration of the corrosion resistance of the material, the irradiation-induced stress corrosion cracking, the grain boundary embrittlement, and the irradiation embrittlement resulting from the foregoing can be prevented.

Therefore, when the equipment parts of the reactor core and the nuclear fusion reactor wall subjected to neutron irradiation are made of the austenitic stainless steel of the present invention having a superior resistance to the irradiation-induced segregation, the safety and reliability of the equipment parts are enhanced, and therefore the safety and reliability of the nuclear reactor and the fusion reactor are enhanced, and therefore the lifetime of the equipment parts is prolonged, so that an economic operation of the reactor can be achieved.

What is claimed is:

1. A nuclear reactor comprising a reactor vessel and structural members made of an austenitic stainless steel having a superior resistance to irradiation-induced segregation, said steel consisting, by weight, of: 0.001 to 0.008% C, not more than 1% Si; not more than 2% Nm; 15 to 22Cr; 8 to 15% Ni; at least one additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one additive being in a solid solution state, said steel having a wholly austenitic structure substantially free of carbide.

2. A nuclear reactor comprising a reactor vessel and structural members made of an austenitic stainless steel having a superior resistance to irradiation-induced segregation, said steel consisting, by weight, of: 0.001 to 0.008% C, not ore than 1% Si; not more than 2% Mn; 15 to 22% Cr; 8 to 15% Ni: at least one additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one additive being in a solid solution state, said steel having a wholly austenitic structure substantially free of carbide.

3. A nuclear reactor comprising a reactor vessel and structural members made of an austenitic stainless steel having a superior resistance to irradiation-induced segregation, said steel consisting, by weight, of: 0.001 to 0.008% C, not more than 1% Si; not more than 2% Mn; 15 to 22% Cr; 8 to 15% Ni; not more than 3% Mo; at least one additive selected from the group consisting of Ti more than 0.2% but not more than 0.6%, Zr more than 0.2% but not more than 1.149, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one additive being in a solid solution state, said steel having a wholly austenitic structure substantially free of carbide.

4. A nuclear reactor comprising a reactor vessel and structural members made of an austenitic stainless steel having a superior resistance to irradiation-induced segregation, said steel consisting, by weight, of: 0.001 to 0.008% C, not more then 1% Si; not more than 2% Mn; 15 to 22% Cr; 8 to 15% Ni; no more than 3% Mo; at least one additive selected from the group consisting of Ti more than 0.2% but not more than 0.6%, Zr more than 0.2% but not more than 1.14%, Hf more than 0.2% b ut not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one additive being in a solid solution state, said steel having a wholly austenitic structure substantially free of carbide.

5. A nuclear reactor according to any one of claims 1 to 4, wherein said structural members made of said austenitic stainless steel include at least one of a neutron source pipe, a reactor core support plate, a neutron instrumentation pipe, a control rod insertion pipe, a shroud, an upper lattice plate, a fuel assembly cladding pipe, and a channel box.

6. A nuclear reactor having a structure used in an environment which is irradiated with not less than $5 \times 10^{20}$ n/cm$^2$ of neutrons having an energy of not less than 0.1 MeV, said structure comprising austenitic stainless steel having a superior resistance to irradiation-induced segregation consisting, by weight of: 0.001 to 0.008% C, not more than 1% Si; not more than 2% Mn; 15 to 22% Cr; 8 to 15% Ni; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, said steel having a wholly austenitic structure substantially free of carbide.

7. A nuclear reactor having a structure used in an environment which is irradiated with not less than $5 \times 10^{20}$ n/cm$^2$ of neutrons having an energy of not less than 0.1 MeV, said structure comprising austenitic stainless steel having a superior resistance to irradiation-induced segregation consisting, by weight, of: 0.001 to 0.008% C, not more than 1% Si; not more than 2% Mn; 15 to 22% Cr; 8 to 15% Ni at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one kind additive being in a solid solution state, said steel having a wholly austenitic structure substantially free of carbide.

8. A nuclear reactor having a structure used in an environment which is irradiated with not less than $5 \times 10^{20}$ n/cm$^2$ of neutrons having an energy of not less than 0.1 MeV, said structure comprising austenitic stainless steel having a superior resistance to irradiation-induced segregation consisting, by weight, of: 0.001 to 0.008% C, not more than 1% si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, said steel having a wholly austenitic structure substantially free of carbide.

9. A nuclear reactor having a structure used in an environment which is irradiated with not less than $5 \times 10^{20}$ n/cm$^2$ of neutrons having an energy of not less than 0.1 MeV, said structure comprising austenitic stainless steel having a superior resistance to irradiation-induced segregation consisting, by weight, of: 0.001 to 0.008% C, not more than 1% Si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one kind additive being in a solid solution state, said steel having a wholly austenitic structure free of carbide.

10. A nuclear reactor comprising structural members within a reactor pressure vessel which structural members includes a neutron source pipe, a reactor core support plate, a neutron instrumentation pipe, a control rod insertion pipe, a shroud, an upper lattice plate, a fuel assembly cladding pipe, and a channel box, said members being made of austenitic stainless steel having a superior resistance to irradiation-induced segregation consisting, by weight, of: 0.001 to 0.008% C, not more than 1% Si; not more than 2% Mn; 15 to 22% Cr; 8 to 15% Ni; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities said at least one kind additive being in a solid solution state, said steel having a wholly austenitic structure free of carbide.

11. A nuclear reactor comprising structural members within a reactor pressure vessel which structural members includes a neutron source pipe, a reactor core support plate, a neutron instrumentation pipe, a control rod insertion pipe, a shroud, an upper lattice plate, a fuel assembly cladding pipe, and a channel box, said members being made of austenitic stainless steel having a superior resistance to irradiation-induced segregation consisting, by weight, of: 0.001 to 0.008% C, not more than 1% Si; not more than 2% Mn; 15 to 22% Cr; 8 to 15% Ni; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one kind additive being in a solid solution state, said steel having a wholly austenitic structure free of carbide.

12. A nuclear reactor comprising structural members within a reactor pressure vessel which structural members includes a neutron source pipe, a reactor core support plate, a neutron instrumentation pipe, a control rod insertion pipe; a shroud, an upper lattice plate, a fuel assembly cladding pipe, and a channel box, said members being made of austenitic stainless steel having a superior resistance to irradiation-induced segregation consisting, by weight, of: 0.001 to 0.008% C, not more than 1% Si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, said steel having a wholly austenitic structure substantially free of carbide.

13. A nuclear reactor comprising structural members within a reactor pressure vessel which structural members includes a neutron source pipe, a reactor core support plate, a neutron instrumentation pipe, a control rod insertion pipe, a shroud, an upper lattice plate; a fuel assembly cladding pipe, and a channel box, said members being made of austenitic stainless steel having a superior resistance to irradiation-induced segregation consisting, by weight, of: 0.001 to 0.008% C, not more than 1% Si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one kind additive being in a solid solution state, said steel having a wholly austenitic structure substantially free of carbide.

14. A nuclear fusion reactor comprising a diverter, a first wall, and a blanket which are mounted within a vacuum vessel having a water-cooled structure, said diverter having a water-cooled structure provided at a plasma side thereof with ceramic tiles, said first wall having a water-cooled structure provided at the plasma side thereof with ceramic tiles, at least one of said structural members of said fusion reactor being made of austenitic stainless steel consisting, by weight, of: 0.001 to 0.008% C, not more than 1% Si; not more than 2% Mn 15 to 22% Cr; 8 to 15% Ni; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, said steel having a wholly austenitic structure free of carbide.

15. A nuclear fusion reactor comprising a diverter, a first wall, and a blanket which are mounted within a vacuum vessel having a water-cooled structure, said diverter having a water-cooled structure provided at a plasma side thereof with ceramic tiles, said first wall having a water-cooled structure provided at the plasma side thereof with ceramic tiles, at least one of said structural members of said fusion reactor being made of austenitic stainless steel consisting, by weight, of: 0.001 to 0.008% C, not more than 1% Si; not more than 2% Mn; 15 to 22% Cr; 8 to 15% Ni; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one kind additive being in a solid solution state, said steel having a wholly austenitic structure substantially free of carbide.

16. A nuclear fusion reactor comprising a diverter, a first wall, and a blanket which are mounted within a vacuum vessel having a water-cooled structure, said diverter having a water-cooled structure provided at a plasma side thereof with ceramic tiles, said first wall having a water-cooled structure provided at the plasma side thereof with ceramic tiles, at least one of said structural members of said fusion reactor being made of austenitic stainless steel consisting, by weight, of: 0.001 to 0.008% C, not more than 1% Si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; and the balance Fe and incidental impurities, said at least one kind additive being in a solid solution state, said steel having a wholly austenitic structure substantially free of carbide.

17. A nuclear fusion reactor comprising a superior resistance to irradiation-induced segregation so as to produce a nuclear fusion reactor comprising a diverter, a first wall, and a blanket which are mounted within a vacuum vessel having a water-cooled structure, said diverter having a water-cooled structure provided at a plasma side thereof with ceramic tiles, said first wall having a water-cooled structure provided at the plasma side thereof with ceramic tiles, at least one of said structural members of said fusion reactor being made of austenitic stainless steel consisting, by weight, of: 0.001 to 0.008% c, not more than 1% Si; not more than 2% Mn; 15 to 22% Cr; 8 to 15% Ni; not more than 3% Mo; at least one kind additive selected from the group consisting of Ti more than 0.2% but not more than 0.6%, Zr more than 0.2% but not more than 1.14%, Hf more than 0.2% but not more than 2.24%, V more than 0.2% but not more than 0.64%, Nb more than 0.5% but not more than 1.17%, and Ta more than 0.5% but not more than 2.27%; 0.001 to 0.1% N; and the balance Fe and incidental impurities, said at least one kind additive being in a solid solution state, said steel having a wholly austenitic structure substantially free of carbide.

* * * * *